United States Patent [19]

Ishikawa

[11] 4,023,535

[45] May 17, 1977

[54] ROTARY PISTON INTERNAL COMBUSTION ENGINE WITH A STRATIFIED CHARGE INTAKE PORT SYSTEM

[75] Inventor: Yoshikazu Ishikawa, Chofu, Japan

[73] Assignee: Nissan Motor Co., Ltd., Yokohama, Japan

[22] Filed: Nov. 11, 1975

[21] Appl. No.: 630,920

Related U.S. Application Data

[62] Division of Ser. No. 433,509, Jan. 15, 1974, abandoned.

[30] Foreign Application Priority Data

| Jan. 22, 1973 | Japan | 48-8516 |
|---|---|---|
| Jan. 17, 1973 | Japan | 48-7701 |

[52] U.S. Cl. .............................................. 123/8.13
[51] Int. Cl.² ......................................... F02B 53/04
[58] Field of Search ........................ 123/8.09, 8.13

[56] References Cited

UNITED STATES PATENTS

| 3,136,302 | 6/1964 | Nallinger et al. | 123/8.13 |
|---|---|---|---|
| 3,780,707 | 12/1973 | Cole | 123/8.13 |
| 3,805,747 | 4/1974 | Nakagawa et al. | 123/8.13 |
| 3,915,126 | 10/1975 | Kishimoto et al. | 123/8.13 |
| 3,980,054 | 9/1976 | Kono | 123/8.13 |

FOREIGN PATENTS OR APPLICATIONS

| 2,363,863 | 8/1974 | Germany | 123/8.13 |
|---|---|---|---|

*Primary Examiner*—Carlton R. Croyle
*Assistant Examiner*—Michael Koczo, Jr.

[57] ABSTRACT

A rotary piston internal combustion engine of the type comprising a housing having two lobes and a three sided piston rotatable in planetary fashion within the housing, in which a rich air-fuel mixture and a lean air-fuel mixture separately enter into the housing via an auxiliary intake port and a main intake port, respectively.

2 Claims, 30 Drawing Figures

ROTARY PISTON INTERNAL COMBUSTION ENGINE WITH A STRATIFIED CHARGE INTAKE PORT SYSTEM

This is a division of application Ser. No. 433,509, filed Jan. 15, 1974 and now abandoned.

The present invention relates to rotary piston internal combustion engines of the type comprising a housing having two lobes, a shaft extending axially of the housing, a three-sided piston movable in a planetary fashion within the housing and rotatable about an eccentric provided on the shaft and igniting means whereby working fluid may be ignited. Such a rotary piston internal combustion engine will hereinafter be referred to throughout the description as a rotary piston engine.

In this specification it is to be understood that the term "side", is used with reference to those faces of the piston which, together with the housing, defines the working spaces of the engine.

In a rotary piston engine, each side of the rotary piston may be divided into two equal portions by a line parallel to the axis of the piston: the portion of each side which leads with respect to the normal direction of rotation of the piston will hereinafter be referred to as the leading half of the side of the piston, while the portion which trails with respect to the normal direction of rotation of the piston will hereinafter be referred to as the trailing half of the side of the piston.

In this specification it is also to be understood that an intake port that is disposed in a side plate of the housing is hereinafter referred to as "side port" and such an intake port that is disposed in the peripheral or center housing as a "peripheral port".

It has been already suggested that there should be a stratification of charge in combustion spaces of an internal combustion engine to ensure a rich air-fuel mixture in the neighbourhood of the actual points of ignition. This is effective for reducing toxic components in exhaust gas issuing from the engine, the toxic components including hydrocarbons, carbon monoxide and nitrogen oxides.

It is generally known that, in a rotary piston engine fuels disposed within the area of the trailing piston corner can be ignited only with difficulty because ignition flame does not propagate to the trailing piston corner and surface-to-volume ratio in the trailing piston corner is higher as compared to that in the leading piston corner, thus causing quenching of the flame. Hence, hydrocarbons concentration and carbon monoxide concentration in exhaust gas from the rotary piston engine are comparably higher than a reciprocatory internal combustion engine and fuel consumption is worse because relatively rich air-fuel mixture is required to ensure stable performance of the rotary piston engine. In order to eliminate these drawbacks encountered in the rotary piston engine of the type specified the present invention aims at a stratification of charge to ensure that a rich air-fuel mixture, which is readily ignitable by a spark, is present in the neighbourhood of the actual point or points of ignition.

It is accordingly an object of the present invention to provide a rotary piston engine of the type specified in which a stratification of charge is attained.

It is more specific object of the present invention to provide an intake port system for a rotary piston engine of the type specified which is suitable for a stratified charge.

These and further objects, features, and advantages of the present invention will become obvious from the accompanying drawings, wherein.

Figure 1A:
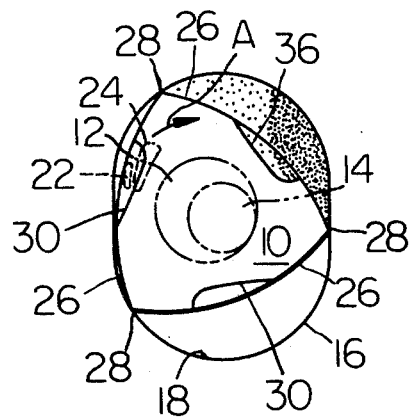
FIGS. 1a–1f are diagrammatic views, illustrating intake ports of a rotary engine according to a first embodiment of the invention, in different positions of a piston within two lobed housing of the rotary piston engine.
Figure 1D:
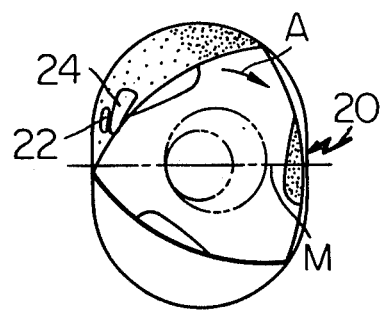
Figure 1B:
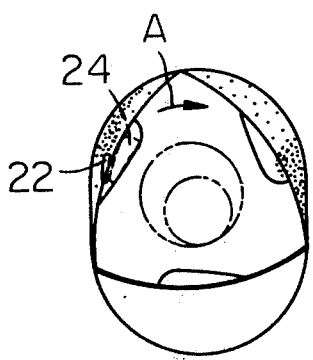
Figure 1E:
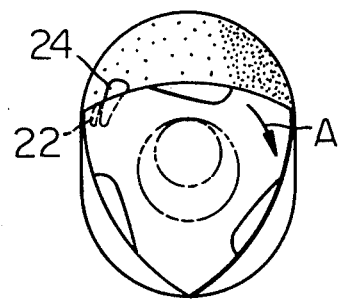
Figure 1C:
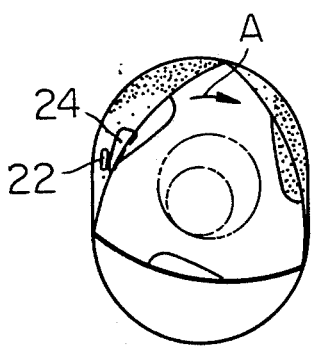
Figure 1F:
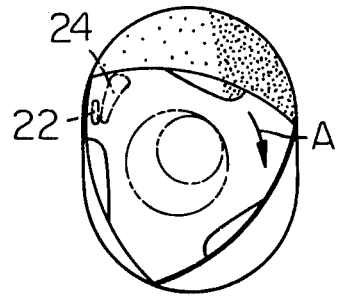
Figure 2A:
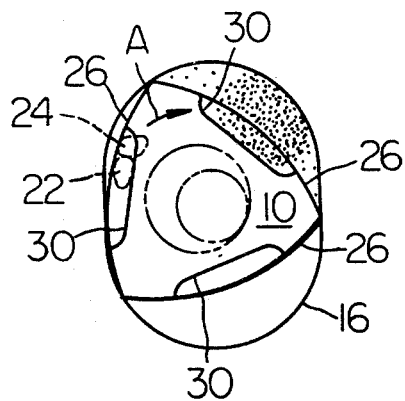
FIGS. 2a–2f are similar views to FIGS. 1a–1f, illustrating a second embodiment of the invention.
Figure 2D:
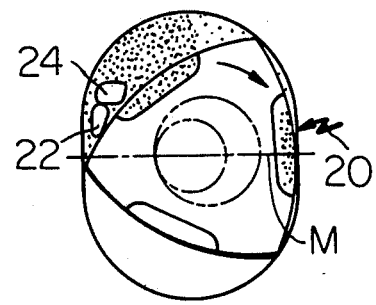
Figure 2B:
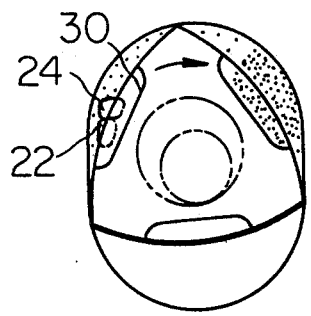
Figure 2E:
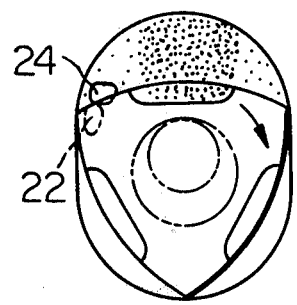
Figure 2C:
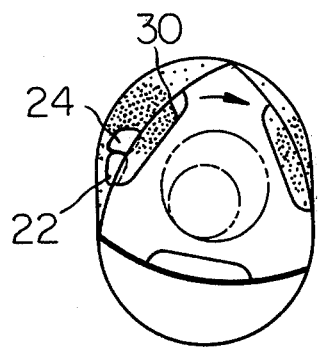
Figure 2F:
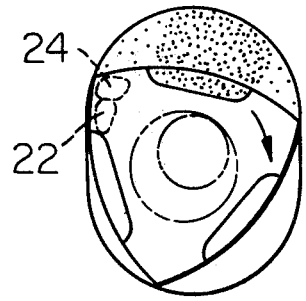
Figure 3A:
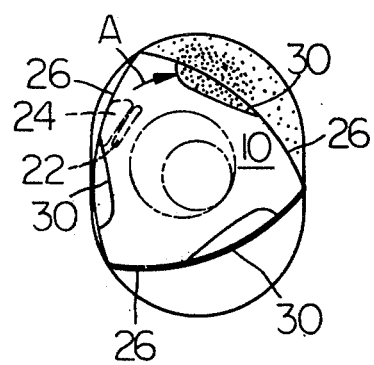
FIGS. 3a–3f are similar views, illustrating a third embodiment of the invention.
Figure 3D:
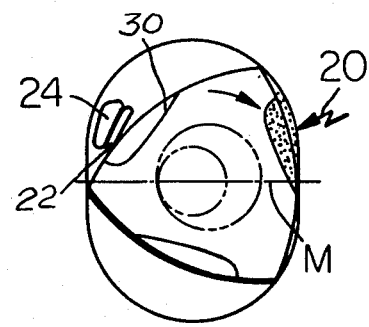
Figure 3B:
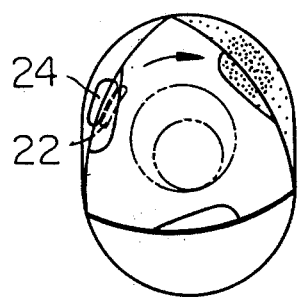
Figure 3E:
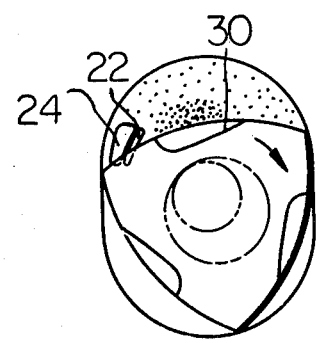
Figure 3C:
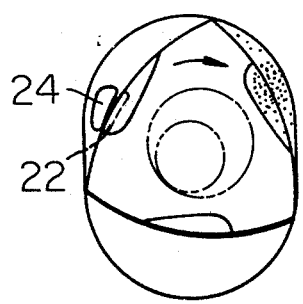
Figure 3F:
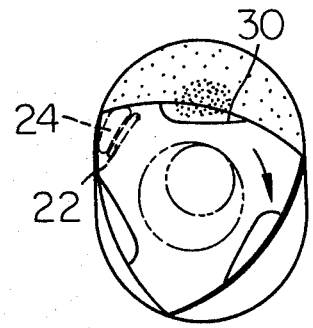
Figure 4A:
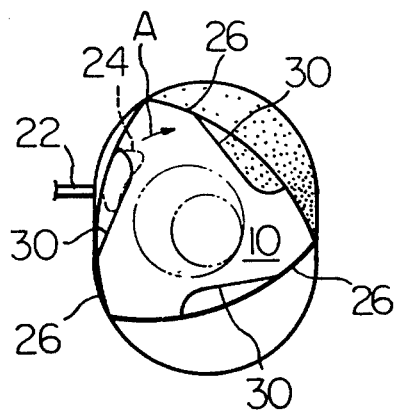
FIGS. 4a–4f are similar views, illustrating a fourth embodiment of the invention.
Figure 4D:
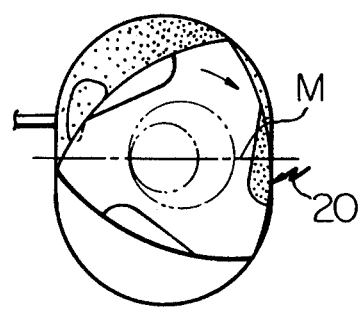
Figure 4B:
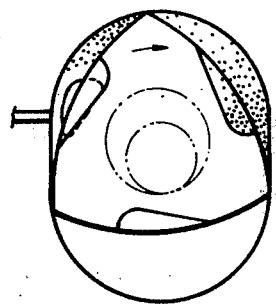
Figure 4E:
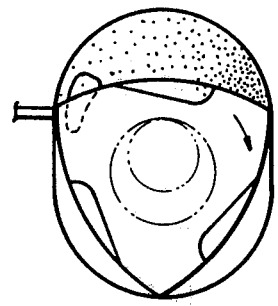
Figure 4C:
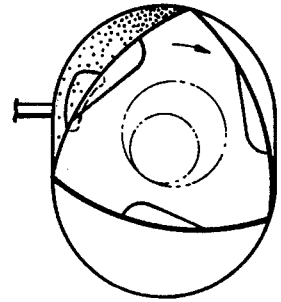
Figure 4F:
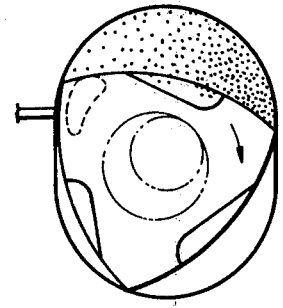
Figure 5A:
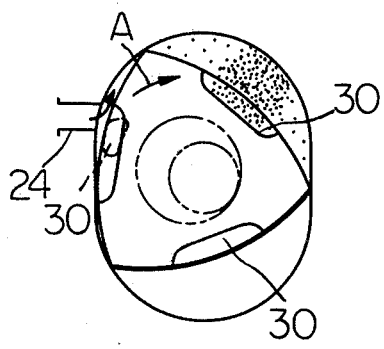
FIGS. 5a–5f are similar views, illustrating a fifth embodiment of the invention.
Figure 5D:
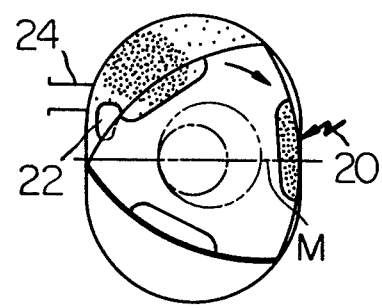
Figure 5B:
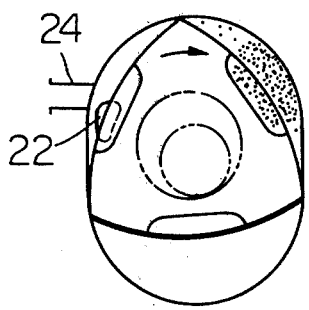
Figure 5E:
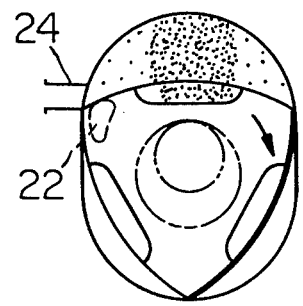
Figure 5C:
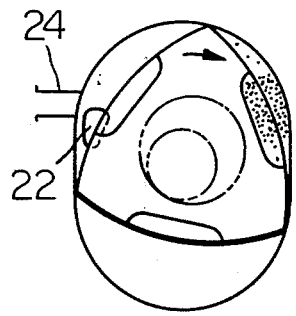
Figure 5F:
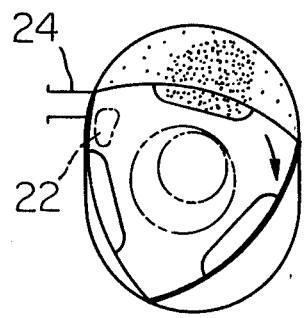

In FIGS. 1a–1f there is shown a rotary piston internal combustion engine adapted to operate on an intake-compression-ignition-exhaust cycle, comprising a three-sided piston 10 rotatably mounted on an eccentric 12 provided on a drive shaft 14 which is journaled in side plates (not shown) of a housing 16 having two-lobed substantially epitrochoidal internal surface 18. The housing 16 is provided with a spark plug schematically indicated at 20 (see FIG. 1d), an auxiliary intake port 22 whereby a rich air-fuel mixture may enter the housing 16, a main intake port 24 whereby a lean air-fuel mixture may enter the housing 16, and an exhaust port (not shown) whereby exhaust gases may be expelled from the housing 16 by the piston 10.

The piston 10 has three working sides 26 between which the apices 28 are defined, the sides 26 cooperating with the housing to define respective variable volume working chambers. Preferably, each side 26 is provided with a combustion chamber 30 leading into the respective working chamber and constituted by a recess which is slightly deeper in the leading half of the side 26 of the piston 10.

The auxiliary intake port 22 and main intake port 24 are in the form of side ports which are so disposed in a direction normal to the direction of rotation of the piston 10 (indicated by an arrow A) that the auxiliary intake port 22 is located radially outward of the main intake port 24 with respect to the rotation of the piston 10. The sizes and locations of both the intake ports 22 and 24 are chosen so that the auxiliary intake port 22 alone communicates with each working chamber during the initial portion of the intake stroke (see FIG. 1b), both the auxiliary intake port 22 and the main intake port communicate with the chamber during the intermediate portion of the intake stroke (see FIGS. 1c and 1d), and the main intake port 24 alone communicates with the same working chamber 30 during the last portion of the intake stroke (see FIG. 1e) a small amount of rich fuel air mixture and large amount of a lean fuel air mixture thus entering the respective working chamber during the intake stroke upon rotation of the piston 10 in the direction of the arrow A.

For admitting a rich fuel air mixture and a lean fuel air mixture into the housing 16, a rich setting carburettor (not shown) may preferably be arranged to admit a rich mixture into the housing 16 via the auxiliary intake port 22 and a lean setting carburettor to admit a lean mixture into the housing 16 via the main intake port 24.

As will be understood from FIGS. 1a–1f, the auxiliary intake port 22 and the main intake port 24 are both closed in the position of FIG. 1a and, as the piston 10 rotates, an ignitable rich mixture alone first enters into the respective working chamber and will occupy an area thereof adjacent the leading piston corner. When the main intake port 24 is opened with the auxiliary intake port 22 still opened (see FIGS. 1c and 1d), a rich mixture and a lean mixture enter into the working chamber. Finally, when the auxiliary intake port 22 is closed and the main intake port 24 still opened (see FIG. 1e), a lean mixture alone enters into the working chamber and will occupy an area thereof adjacent the trailing piston corner. Accordingly, the mixture component disposed within the area thereof adjacent the leading piston corner is rich enough for spark ignition, whereas the mixture component disposed within the area thereof adjacent the trailing piston corner is lean, so that the rich mixture component disposed within the working chamber will be the first to reach an area located directly in front of the spark plug 20 as the piston 10 rotates. Notwithstanding the large amount of loan mixture, a safe and reliable ignition is assured by this rich mixture component (indicated by a shadow) and the lean mixture component burns satisfactorily by the flame produced by the rich mixture. It is possible in this manner to achieve a satisfactory combustion in all cases.

It will now be appreciated that a stratification of the charge is achieved by the auxiliary intake port 22 and the main intake port 24.

It has been found that the most desirable stratification is achieved if the recess 30 is slightly deeper in the leading half thereof.

It has been also found that safe and reliable ignition and satisfactory combustion are assured if the spark plug is located at a position spaced before the minor axis M by an angular distance between 7° and 8°. Moreover, as sufficient amount of air is disposed in the area of the working chamber adjacent the trailing piston corner complete combustion of fuel disposed in this area is achieved.

Referring to FIGS. 2a–2f there is shown a second embodiment of the present invention. The second embodiment is similar to the first embodiment in that auxiliary intake port 22 and main intake port 24 are in the form of side ports and the main intake port 24 alone communicates with each working chamber during the last portion of the intake stroke whereby relatively lean mixture may be disposed within the area of the working chamber adjacent the trailing piston corner. However this embodiment is different from the previous embodiment in that the main intake port 24 is in front of the auxiliary intake port 22 with respect to the direction of rotation of the piston 10, and the sizes and locations of the both intake ports 22 and 24 are chosen so that they both communicate with each working chamber during the other portions of the intake stroke, the main intake port 24 alone communicating with each working chamber during the last portion of the intake stroke as can readily be understood from FIG. 2e.

With this intake port system the most desirable stratification is achieved if each combustion chamber 30 takes the form of a recess which is deeper in the center of the side of the piston.

Advantageously a spark plug 20 (see FIG. 2d) may be located at a position spaced before the minor axis M of the two lobes by an angular distance between 7° and 8° similarly to the first embodiment.

Referring to FIGS. 3a–3f there is shown a third embodiment which is different from the first embodiment in that auxiliary intake port 22 and main intake port 24 are so disposed in a direction normal to the direction of rotation of piston 10 (arrow A) that the auxiliary intake port 22 is located radially inward of the main intake port 24 with respect to rotation of the piston 10. Moreover, the sizes and locations of both the intake ports 22 and 24 are chosen so that firstly the main intake port 24 alone communicates with each working chamber before the auxiliary intake port 22 and that both the intake ports 22 and 24 are simultaneously closed to complete the intake stroke.

With this intake port system the most desirable stratification is achieved if each combustion chamber 30 takes the form of a recess which is located towards and deeper in the trailing half of the side 26 of the piston 10.

In contrast to the first embodiment, safe and reliable ignition and satisfactory combustion are assured by a spark plug 20 located at a position spaced before the minor axis M of the two lobes by an angular of 40°.

Referring to FIGS. 4a–4f there is shown a fourth embodiment of the invention. This embodiment is different from the first embodiment in that auxiliary intake port 22 is a peripheral port and main intake port 24 is a side port. Moreover, combustion chamber 30 takes the form of a recess which is deeper, than that of first embodiment, in the leading half of side 26 of piston 10.

Although this embodiment is different from the first embodiment in the above respects the port opening schedule is similar to that of the first embodiment, as will be understood from the comparison of FIGS. 4a–4f with FIGS. 1a–1f.

Advantageously, a spark plug 20 may be located at a position spaced beyond the minor axis of the two lobes by an angular distance between 7° and 8° to obtain a safe and reliable ignition and satisfactory combustion.

Referring finally to FIGS. 5a–5f there is shown a fifth embodiment of the present invention which is similar to the second embodiment except for that auxiliary intake port 22 is a side port and main intake port 24 is a peripheral port. Moreover the sizes and locations of the both intake ports 22 and 24 are chosen so that the main intake port 24 communicates with each working chamber before the auxiliary intake port 22 as will be understood from FIGS. 5a–5f.

With this embodiment the most desirable stratification is achieved if each combustion chamber 30 takes the form of a recess which is deeper in the center of the side of the piston similarly to the second embodiment.

Advantageously, a spark plug 20 may be located at a position spaced before the minor axis of the two lobes by an angular distance between 7° and 8°.

As will be understood from the various embodiments of the present invention, stratification of the charge has been achieved by the intake port system including auxiliary intake port 22 and main intake port 24.

It will be appreciated that satisfactory combustion of fuel is possible with the aid of sufficient amount of air. Reduction of toxic contents in exhaust gas is achieved. Also economy of fuel is achieved.

What is claimed is:
1. A rotary piston internal combustion engine comprising:
    a housing having a cavity, said housing having a two lobed peripheral wall and two oppositely facing end walls interconnected by a peripheral wall to define the cavity;

a rotary piston rotatably disposed in the cavity to form a plurality of working chambers in cooperation with said housing walls, said rotary piston having sides each of which is formed with a recess that is deeper in the leading half of each side of said rotary piston;

the peripheral wall having an auxiliary intake port opening to the cavity;

one of the two oppositely facing end walls having a main intake port opening to the cavity, both of said intake ports being configured and sized such that said auxiliary intake port commences to communicate with one of the working chambers before said main intake port does and said main intake port is closed after said auxiliary intake port is to complete the intake phase of the one working chamber;

means for supplying a rich mixture to said auxiliary intake port;

means for supplying a lean mixture to said main intake port; and ignition means including a spark plug which is located at a position spaced beyond the minor axis of the two lobed peripheral wall by a predetermined angular distance from substantially 7 degrees to substantially 8 degrees.

2. A rotary piston internal combustion engine comprising:

a housing having a cavity, said housing having a two lobed peripheral wall and two oppositely facing end walls interconnected by a peripheral wall to define the cavity;

a three lobed rotary piston rotatably disposed in the cavity to form three working chambers in cooperation with said housing walls, said rotary piston having three sides each of which is formed with a bilge like recess that is deeper in the leading half of each side of said rotary piston;

the peripheral wall having an auxiliary intake port opening to the cavity;

one of the two oppositely facing end walls having a main intake port opening to the cavity, both of said intake ports being configured and sized such that said auxiliary intake port commences to communicate with one of the working chambers before said main intake port does and said main intake port is closed after said auxiliary intake is to complete the intake phase of the one working chamber;

a first carburetor for supplying a rich mixture to said auxiliary intake port;

a second carburetor for supplying a lean mixture to said main intake port; and ignition means including a spark plug which is located at a position spaced beyond the minor axis of the two lobed peripheral wall by a predetermined angular distance from substantially 7° to substantially 8°.

* * * * *